United States Patent
Kaposi et al.

(10) Patent No.: US 8,347,783 B2
(45) Date of Patent: Jan. 8, 2013

(54) CHERRY PITTER

(75) Inventors: Sascha Kaposi, Tacoma, WA (US);
Justin Bagley, Seattle, WA (US);
Joanna Clark, Tacoma, WA (US)

(73) Assignee: Progressive International Corporation, Kent, WA (US)

( * ) Notice: Subject to any disclaimer, the term of this patent is extended or adjusted under 35 U.S.C. 154(b) by 517 days.

(21) Appl. No.: 12/697,918

(22) Filed: Feb. 1, 2010

(65) Prior Publication Data

US 2010/0199863 A1    Aug. 12, 2010

Related U.S. Application Data

(60) Provisional application No. 61/152,189, filed on Feb. 12, 2009.

(51) Int. Cl.
*A23N 4/06* (2006.01)
*A47J 23/00* (2006.01)

(52) U.S. Cl. ............ 99/560; 99/549; 99/553; 99/556; 99/557; 99/559; 99/565; 30/113.2; 30/113.1

(58) Field of Classification Search .......... 99/547, 99/549, 550, 553, 555, 556, 557, 559, 560, 99/564, 565; 30/113.1, 113.2, 113.3
See application file for complete search history.

(56) References Cited

U.S. PATENT DOCUMENTS

| | | | | |
|---|---|---|---|---|
| 77,571 | A * | 5/1868 | Wright | 34/280 |
| 103,317 | A * | 5/1870 | Fisher | 99/559 |
| 741,194 | A * | 10/1903 | Von Uffel et al. | 30/113.2 |
| 1,171,546 | A * | 2/1916 | Schnee | 30/113.2 |
| 1,432,012 | A * | 10/1922 | Barndt | 30/113.2 |
| 2,463,854 | A * | 3/1949 | Cowan | 99/559 |
| 2,712,333 | A * | 7/1955 | Hirao | 99/560 |
| D548,025 | S | 8/2007 | Kaposi | |
| 7,549,227 | B2 * | 6/2009 | De Blasis et al. | 30/113.2 |
| D612,194 | S | 3/2010 | Kaposi et al. | |

FOREIGN PATENT DOCUMENTS

CA    131358    2/2010

* cited by examiner

*Primary Examiner* — Reginald L Alexander
(74) *Attorney, Agent, or Firm* — Lowe Graham Jones PLLC

(57) ABSTRACT

A cherry pitter includes a container having a removable cherry holder with a plurality of cavities for holding cherries. A mating plurality of cutters is secured to the lid of the container, which is pivotally secured to the container. By rotating the lid downward the cutters are pushed into and through the cherries, pushing the pits into the container. A spring-loaded push-off plate holds the cherries down against the holder as the lid rotates upward again, separating the cherries from the cutters. These and other examples of the invention will be described in further detail below.

13 Claims, 4 Drawing Sheets

CHERRY PITTER

PRIORITY CLAIM

This application claims the benefit of prior U.S. provisional application Ser. No. 61/152,189, filed Feb. 12, 2009.

FIELD OF THE INVENTION

This invention relates generally to devices for removing the pits from cherries.

BACKGROUND OF THE INVENTION

There are several devices for pitting cherries, though most of them currently involve a small hand-held device in which the pit of a single cherry pit is removed from a single cherry. Such devices are slow and tedious to use, and typically generate splatters of cherry juice that stain the hands of the user and the countertops of the kitchen or other location where the devices are used. Industrial devices exist for pitting cherries, but they are unsuitable for typical home use.

SUMMARY OF THE INVENTION

A preferred cherry pitter is described in accordance with the drawings includes a container having a removable cherry holder with a plurality of cavities for holding cherries. A mating plurality of cutters is secured to the lid of the container, which is pivotally secured to the container. By rotating the lid downward the cutters are pushed into and through the cherries, pushing the pits into the container. A spring-loaded push-off plate holds the cherries down against the holder as the lid rotates upward again, separating the cherries from the cutters. These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
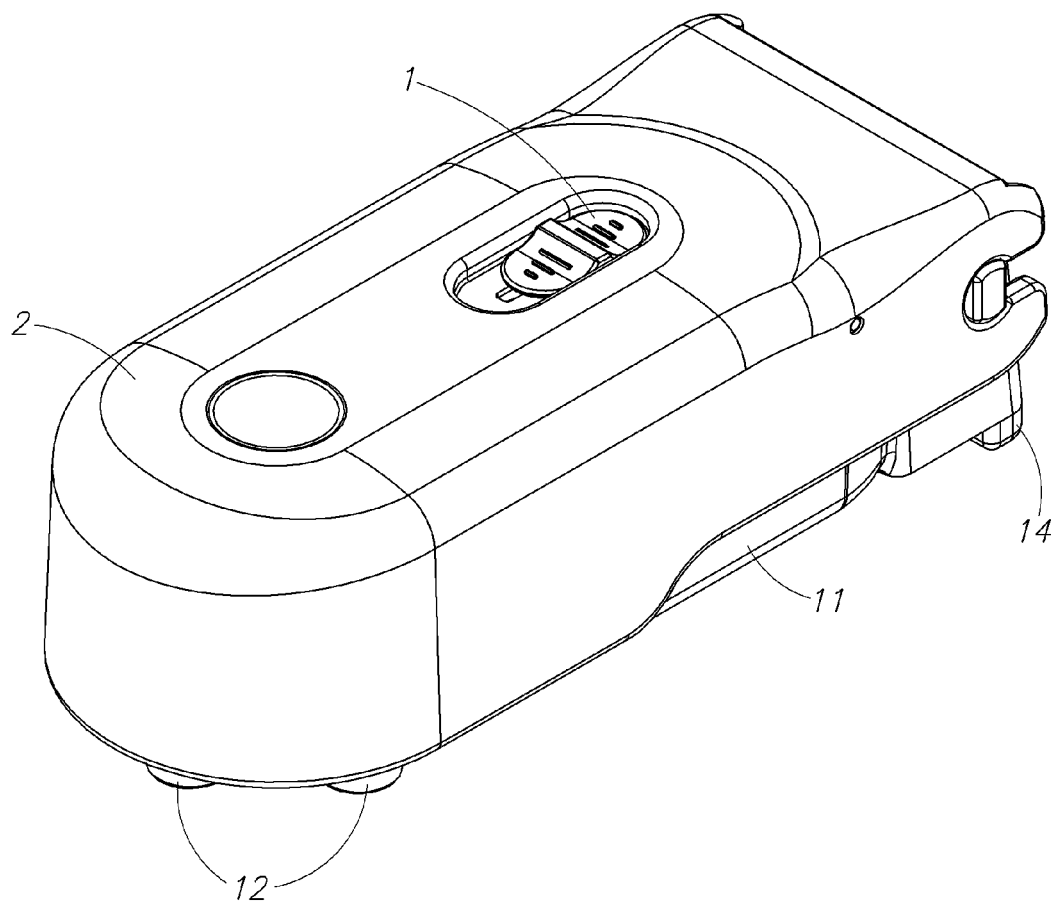
FIG. 1 is a perspective view of a preferred cherry pitter, shown with a lid closed.
Figure 2:
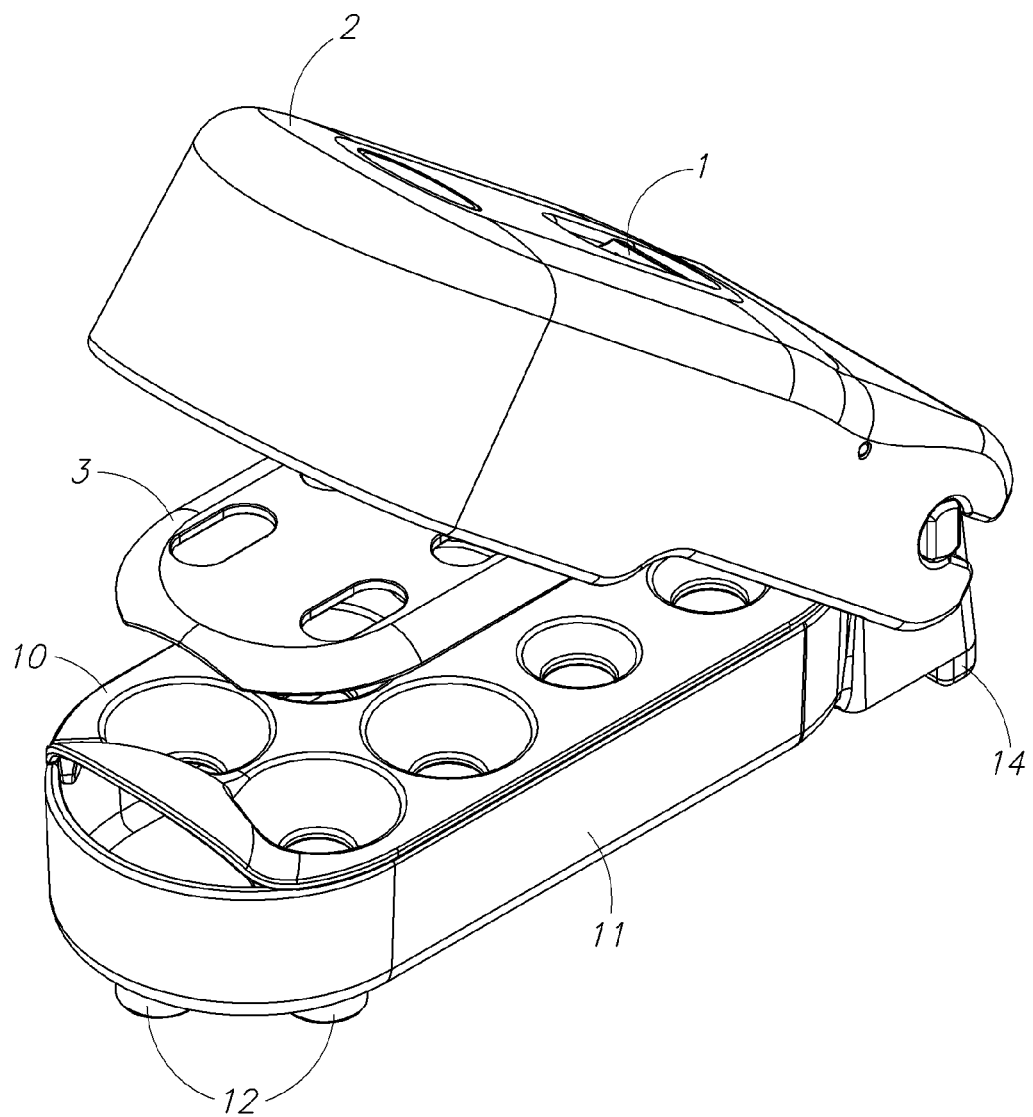
FIG. 2 is a perspective view of a preferred cherry pitter, shown with the lid opened.
Figure 3:
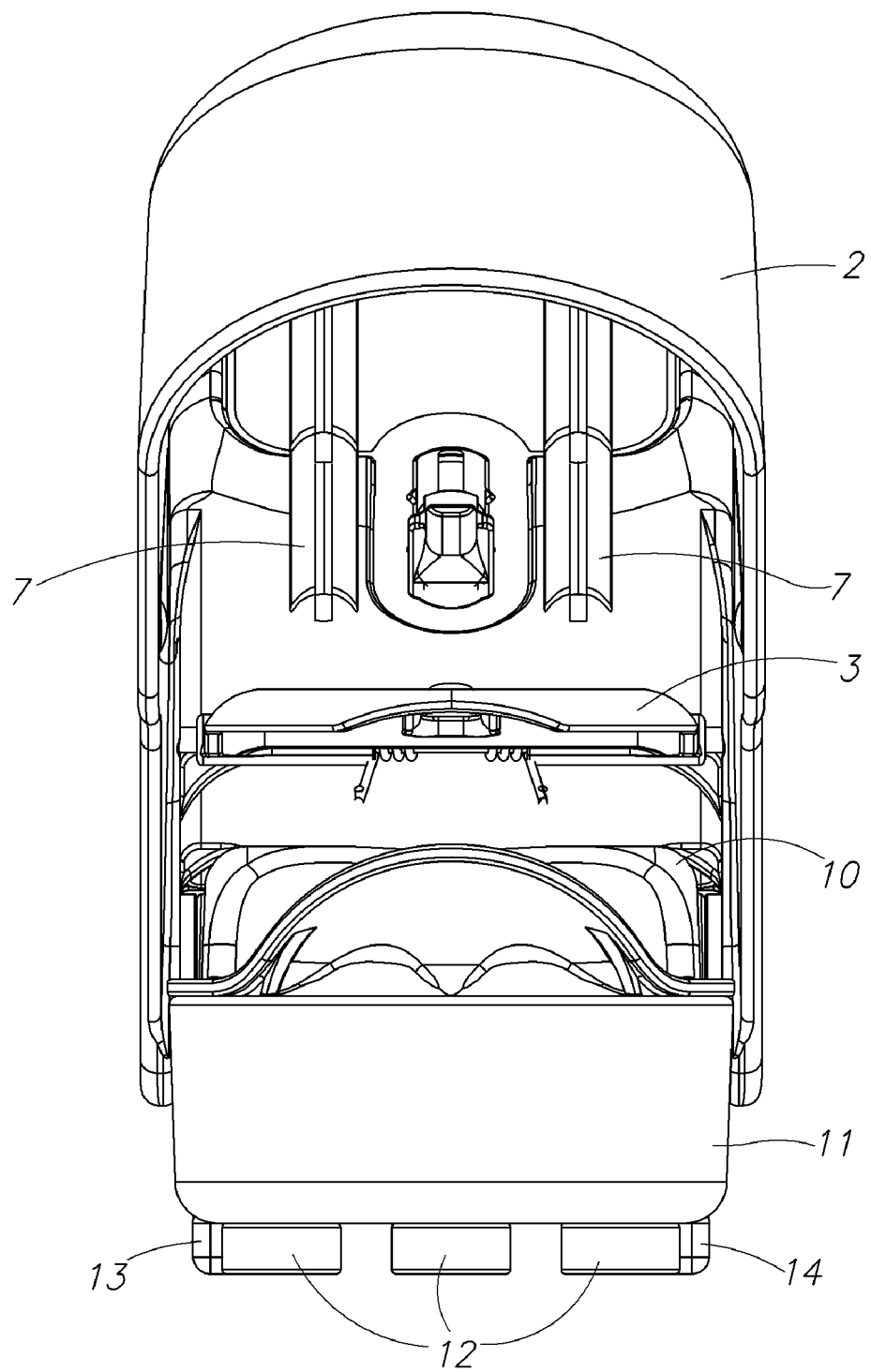
FIG. 3 is a front view of a preferred cherry pitter with the lid opened.
Figure 4:
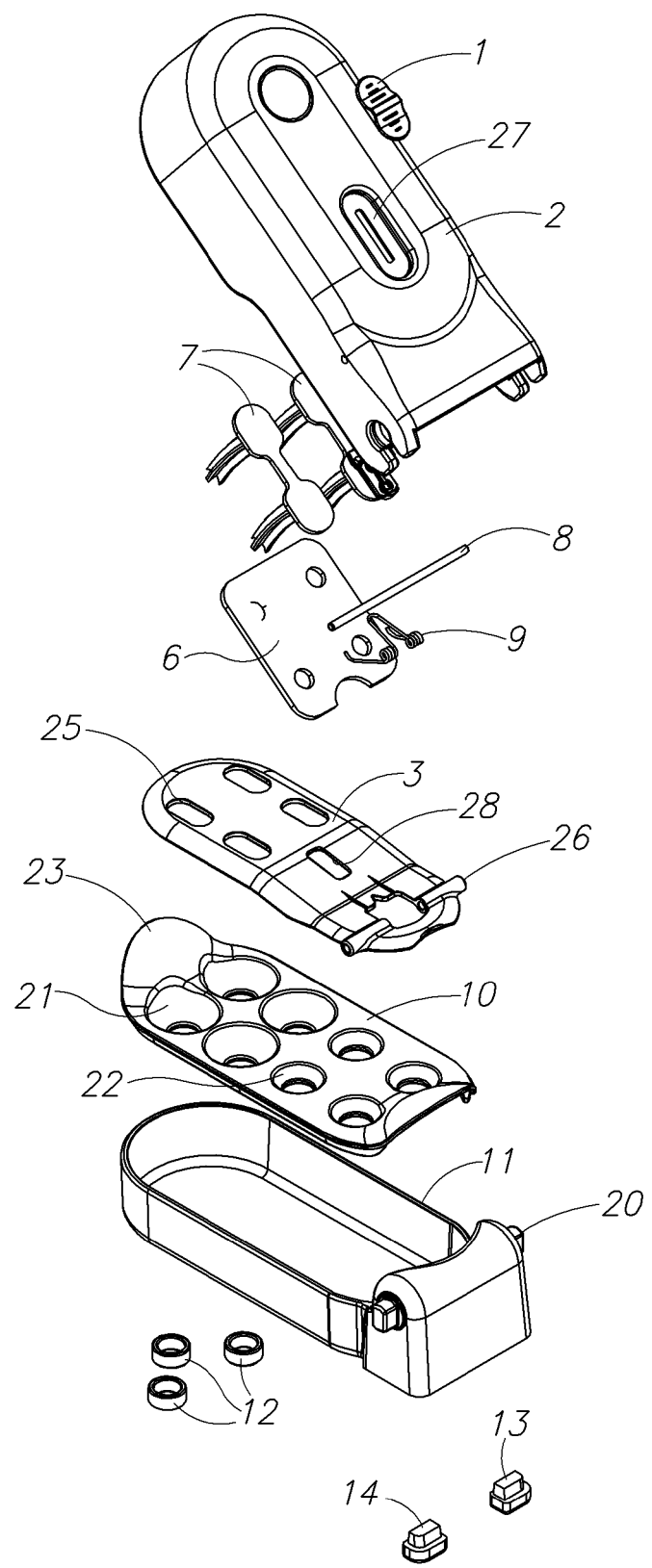
FIG. 4 is an exploded view of a preferred cherry pitter.

A preferred cherry pitter generally includes a lid 2 mounted on a base 11 for pivotal movement. A cherry holder 10 is secured at the top of the base and is configured to hold several cherries at a time. Cherry pit pushers/cutters 7 are attached to and project downwardly from the lid. The preferred device includes a number of cutters 7 that match the number of cherry holding spaces in the holder 10 in order to simultaneously remove the pits from several cherries. In some versions, the holder 10 is reversible to accommodate cherries or pitted fruits of different sizes, and therefore may have a number of holding spaces that is greater than the number of rods contained on the pusher/cutter.

The base 11 is preferably formed from clear plastic and forms a container having a bottom surface and upwardly extending sidewalls. In this configuration, the container forms an interior cavity that can catch cherry juice and bits of cherries that are produced during the pitting process. In a preferred version the lower side of the bottom of the container may have one or more feet 12, 13, 14, and most preferably the feet are formed from a thermoplastic elastomer, rubber, or similar materials that will provide a non-skid surface at the bottom of the container.

A pair of lugs 20 are provided at one end of the container to serve as pivoting axles for the lid. The lugs are generally cylindrical in cross-sectional shape and terminate in an enlarged retaining cap to prevent the lid from sliding off of the lugs in a lateral direction. In the version as illustrated, the container, lugs, and caps are integrally formed from the same material.

The container forms a rim at the top of the upwardly projecting sidewalls, with the rim being configured to support the cherry holder 10. In a preferred version, the lugs are formed atop a pair of opposing pillars for structural support, with the pillars being configured such that the lugs are at a level above the surface of the rim.

The cherry holder 10 includes an upper surface and a lower surface. The lower surface includes a peripheral flange sized to rest atop the rim of the container while a peripheral sidewall of the cherry holder is snugly received within the container. In this fashion, the cherry holder is frictionally retained within the rim of the container but is easily removable.

The top surface of the cherry holder includes a plurality of cavities configured to hold cherries. Though only one cherry holding cavity may be provided in some versions, in the preferred examples a plurality of cavities are provided. Most preferably at least four cavities are provided, and in the version as illustrated a first set of four cherry holding cavities 21 are provided in a configuration forming two rows of two cavities at one end of the cherry holder and a second set of four cherry holding cavities 22 are similarly arranged at a second end of the cherry holder. The first set of cavities are relatively larger than the second set, in order to accommodate cherries of different sizes.

Each of the two ends of the cherry holder includes means for grasping the cherry holder in order to remove it from the container. As shown, the means for grasping is configured as an upwardly extending rounded surface 23, preferably sized to allow a finger to be inserted at least partially between the cherry holder and the container. Most preferably the cherry holder is configured so that it is reversible in order to be used for large or small cherries. Accordingly, in the version as shown there is a means for grasping the holder provided at each end, along with a symmetrical arrangement of cherry holding cavities.

Each of the cherry holding cavities includes a hole formed within the cavities at a central location to allow the cutters 7 to fully penetrate the cherries and extend into the container. The holes within each of the first set of cavities are formed at particular locations in order to properly receive the cutters extending from the lid; likewise the holes within the second set of cavities are formed in a similar location to receive the cutters when the cherry holder is reversed to accommodate smaller cherries.

The lid 2 is configured to have an upper surface with downwardly extending sidewalls, the sidewalls being arranged to abut the sidewalls of the container. One end of the lid includes an opening designed to receive the lugs in order to support and retain the lid for pivotal movement about the lugs. The opposite end of the lid is shaped to fit about the exterior surface of the container when the lid is pivoted in a downward position with respect to the container.

A plurality of cutters 7 are secured to an interior side of the upper surface of the lid. In the preferred example as shown, four cutter blades are provided, arranged in two rows of two blades as with the cavities described above. The cutter blades are integrally formed with a cutter base plate, with the cutter blades extending generally orthogonally from the base plate. As shown, two cutter blades are integrally formed with a base plate, with the pair of cutter blades and the base plate preferably being formed from a die cast zinc alloy that is chrome plated. Two base plates, each having two cutter blades, are secured to the interior side of the lid so that the cutter blades extend downward from the lid.

A cutter holding plate 6 sandwiches the cutter base plate between the cutter holding plate 6 and the lid 2. The cutter holding plate includes four holes allowing the cutter blades to pass through the holes (or a different number of holes, depending on the number of cutters provided in other versions). The cutter holding plate is preferably formed from ABS or other plastic materials, and is solvent bonded, sonic welded, or otherwise secured to the interior surface of the lid to hold the cutters in position.

The cutters are shaped with a slight arc in the longitudinal direction from the base plate to the tip of the cutters. In cross section, the cutters have a "cross" or "+" shape. At the tip, the cutters have a generally rounded or spherical indentation, thereby allowing the indentation and the pointed edges of the "+" shaped tip to engage and hold a cherry pit as it pierces the cherry and pushes through it. In use, the relatively sharpened tips of the cutters pass through the cherries and push the pits through the holes within the cavities, retaining the pits within the container 11.

A push-off plate 3 is secured to the lid and serves to facilitate separation of the cutters from the cherries once the pits are pushed through. The push-off plate includes a number of longitudinal slots 25 that are configured to allow the cutters to pass through. In the version as shown, four such slots are provided in order to allow the four cutters to pass through the push-off plate. The slots are located at a forward end of the push-off plate, above the cavities and below the cutters.

The rear end of the push-off plate includes a retainer 26 for receiving a pin 8, and preferably the retainer is formed as a pair of cylinders on opposing sides of the push-off plate. The retainer is configured to snugly receive the pin in a tight frictional fit so that the pin does not move with respect to the push-off plate.

The pin is formed to extend laterally beyond the push-off plate on each side, and each end of the pin is received within a corresponding hole formed in the lid. The holes on opposing sides of an interior surface of the lid are sized to allow the pin to freely rotate pivotally within the lid. Thus, the push-off plate, via the pin, will pivot within the lid together with the pin.

A spring 9 includes a coil that is carried on the pin, with a first projecting leg engaging the interior surface of the lid and a second projecting leg engaging the push-off plate. The spring is configured to allow the push-off plate to move upward toward the lid when the lid is pressed downward against the cherry holder, and to urge the push-off plate away from the lid as the lid pivots upward away from the cherry holder. Accordingly, the cutters will slide upward and downward within the push-off plate as the lid moves up and down. When cherries are pierced by the cutters, they may stick to the cutters and tend to move upward with the cutters as the lid is opened. The push-off plate serves to push the cherries downward and off of the cutters as the lid moves upward, separating the cherries from the cutters.

A lock is provided to hold the push-off plate toward the lid, allowing the lid to remain closed when not in use. Without a lock, the push-off plate and spring would tend to push the lid upward, but by engaging the lock the push-off plate is retained in a position that will not push the lid upward.

The lock includes a lock button 1 that fits within a well 27 formed in an upper surface of the lid. The lock button preferably includes a raised central portion for engagement by a finger or thumb in order to slide the lock longitudinally within the lid. The well is formed to be somewhat longer than the lock button to accommodate longitudinal motion while retaining the lock button within the well. The lock button includes a lower projection that extends below a slot formed in the well. In the version as shown, the lower projection is in the form of a pair of cylindrical projections. The lock button may optionally include a lateral projection that is configured to engage one of two lateral indentations within the lid, the lateral indentations being located to secure the lock button in either a locked or unlocked position. Alternatively, the lateral indentations may be formed in a lower surface of the lid as discussed below.

The lock includes a lock slider sandwiched between the lock button and a lock hook, the lock slider and hook being configured on a lower side of the lid and mounting the lock button (on the upper side of the lid) to the lid. The lock hook is generally oval in shape, and helps to facilitate sliding of the lock button within the track formed by the well. The lock hook includes a downwardly extending hook projecting forward, toward the front end of the lid. The push-off plate includes a locking slot 28 configured to receive the lock hook. In an unlocked position in which the lock is slid toward the rear of the well, the lock hook freely moves up and down within the locking slot. In a locked position, the lock is slid forward toward the front of the well and the locking hook engages a front edge of the locking slot, thereby holding the push-off plate upward against the lid.

When large cherries or other pitted fruits are to be pitted, they are placed in the larger cavities of the holding plate when the holding plate is placed within the container in the orientation as shown in the drawings. For smaller cherries, the holding plate can be removed from the container, rotated 180 degrees and replaced. Smaller cherries can then be placed in the cavities and pitted in the same manner by pressing down on the lid to urge the rods/cutters down and through the cherries, depositing them into the container.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device for separating a pit from a fruit, comprising:
 a container having a base and upwardly extending sidewalls terminating in a rim;
 a fruit holder supported by the container, the fruit holder, base, and sidewalls defining an interior space of the container, the fruit holder further having at least one cavity for holding the fruit, the at least one cavity further having a hole formed in the cavity;
 a lid attached to the container, the lid being moveable between a first position adjacent the container and a second position relatively distant from the container;
 the lid further having at least one cutting rod extending downward from the lid, the at least one cutting rod being positioned to pass into the cavity and through the hole formed in the cavity when the lid is in the first position; and a push-off plate secured to the lid between the fruit holder and the lid, the push-off plate being positioned such that the at least one cutting rod passes through the push-off plate when the lid is moved from the second position to the first position and is retracted substantially above the push-off plate when the lid is moved from the second position to the first position, a spring further being mounted on the device to urge the push-off plate away from the lid.

2. The device of claim 1, wherein the at least one cavity comprises a first set of four cavities, each of the first set of four cavities including a hole passing through the fruit holder.

3. The device of claim 2, wherein the at least one cutting rod comprises a set of four cutting rods, each one of the four cutting rods being secured to an interior surface of the lid and arranged to pass through a respective one of the four cavities.

4. The device of claim 3, wherein the push-off plate further comprises a plurality of push-off plate holes formed in the push-off plate, each of the push-off plate holes being configured to receive one of the set of four cutting rods.

5. The device of claim 4, wherein the at least one cavity comprises a second set of four cavities, each one of the second set of four cavities being smaller than each one of the first set of four cavities.

6. The device of claim 5, wherein the fruit holder is removably attached to the container such that it is positionable in a first configuration in which the first set of cavities are positioned to receive the four cutting rods, and a second configuration in which the second set of cavities are positioned to receive the four cutting rods.

7. The device of claim 5, further comprising a lock formed in the lid, the lock including a surface extending from the interior surface of the lid to engage a mating surface of the push-off plate, whereby the lid is selectively locked in the second position.

8. The device of claim 5, wherein each of the first set of cavities and the second set of cavities are formed as rounded depressions within the fruit holder.

9. The device of claim 8, wherein each of the holes formed in each of the first set of cavities and the second set of cavities is sized to allow a standard cherry pit to pass through.

10. The device of claim 5, wherein the fruit holder further includes a raised region forming an opening between the fruit holder and the rim of the container, the opening being sized to receive a finger of a user to enable removal of the fruit holder from the container.

11. The device of claim 5, wherein the at least one rod is formed as a + shape when viewed in cross-section.

12. The device of claim 11, wherein the at least one rod is at least slightly curved longitudinally.

13. The device of claim 12, wherein the at least one rod terminates in a tip, the tip having a generally rounded indentation.

* * * * *